United States Patent
Chu

(10) Patent No.: US 6,547,068 B2
(45) Date of Patent: Apr. 15, 2003

(54) SINGLE PUSH-BUTTON TYPE STORAGE CASE FOR COMPACT DISCS

(76) Inventor: Yuk Lung Chu, Room 406, 4th Floor, Cheung Tat Centre, No. 18, Cheung Lee Street, Chai Wan (HK)

( * ) Notice: Subject to any disclaimer, the term of this patent is extended or adjusted under 35 U.S.C. 154(b) by 0 days.

(21) Appl. No.: 09/909,795

(22) Filed: Jul. 23, 2001

(65) Prior Publication Data

US 2003/0015442 A1 Jan. 23, 2003

(51) Int. Cl.[7] ............................................. B65D 85/57
(52) U.S. Cl. .................................. 206/310; 206/308.1
(58) Field of Search .......................... 206/308.1, 310, 206/309, 493

(56) References Cited

U.S. PATENT DOCUMENTS

| | | | |
|---|---|---|---|
| 5,526,926 A | | 6/1996 | Deja |
| 5,788,068 A | | 8/1998 | Fraser et al. |
| 5,944,181 A | * | 8/1999 | Lau .......................... 206/308.1 |
| 5,960,949 A | * | 10/1999 | Wynalda, Jr. ............. 206/307.1 |
| 6,398,022 B1 | * | 6/2002 | Mou et al. ................ 206/308.1 |
| 6,427,833 B1 | * | 8/2002 | Hui ............................. 206/310 |
| 2001/0000599 A1 | * | 5/2001 | Belden, Jr. .................. 206/310 |

* cited by examiner

*Primary Examiner*—David T. Fidei
(74) *Attorney, Agent, or Firm*—Rabin & Berdo, P.C.

(57) ABSTRACT

The present invention relates to a storage case having a central retaining element which comprises a push-button, at least two spring-catches forming a locking element, and at least two supporting clips forming a supporting element. Each spring-catch has a first projecting portion with a projection and a spring-arm and each supporting clip has a second projecting portion and a supporting plate. The spring-arms and the supporting plates are tilted down to form a conical seat. The spring-catches and the supporting clips are spaced by means of the spacing slits. The push-button is placed in the central hole defined by spring-catches and integrated with the underside of spring-catches. When a pressure applied on the push-button is released, the projection will make its outside tilted surfaces to lift the disc from the supporting surface. As such, the user can readily remove the CD.

6 Claims, 2 Drawing Sheets

SINGLE PUSH-BUTTON TYPE STORAGE CASE FOR COMPACT DISCS

The present invention relates to a single push-button type storage case for compact discs.

BACKGROUND OF THE INVENTION

1, Field of the Invention

The present invention relates to a storage case for a disc-shaped information carrier for an optically readable digital audio-disc otherwise known as a compact disc or CD. The disc has a central clearance for it to be clipped or kept in the case. More particularly, the present invention relates to a single push-button type storage case. The storage case has a base and a collar flange on the base. The collar flange is substantially fitted to the outline of the disc and in the center of the collar flange, there is provided a central retaining element. The central retaining element has spring-catches and supporting clips, of which projecting portions pass through the central clearance of the disc. The spring-catches are connected with the push-button and act as a locking element of the disc which overlaps with a thickness of the inner edge of the clearance of the disc.

2, Description of the Related Art

The conventional storage case generally comprises a base member, a lid, and a central retaining element consisting of several pieces or parts, and supporting arms provided near the spring-catches used as supporting points for rotation of spring-catches.

The retaining element can be connected to the clearance of the disc via the spring-catch. This connection is frequently so tight that the disc can only be removed from the storage case by a user who applies an adequate or sufficient pressure on the spring-catches. For example, the user must apply a pressure with a index finger on the tops of the spring-catches consisting of several pieces or parts, to thereby bend back at least a part of the spring-catches, such that the click-stop connection between the retaining element formed by the spring-catches and the clearance of the disc, even if it is not fully released, is nevertheless loosened and it is possible to remove the disc. However, sometime, it is impossible to remove the disc.

U.S. Pat. No. 5,526,926 has described such a storage case. The storage case has a lid and base member. The base member is provided with a central retaining element which is surrounded by a supporting surface and can pass through the central clearance of a compact disc. The central retaining element further comprises spring-catches developed as a locking element which overlaps the inner edge of the clearance of the disc for securing the disc within the case. The central retaining element is like a cylindrical pin. The cylindrical pin is provided with a collar projecting outwards on its upper end, the diameter of which is slightly enlarged on the upper end. The pin is divided by several radial slits which extend to the supporting surface to form a surface used as a push-button and act as spring catches. A CD to be stored can be pressed onto the pin through its central clearance and is then click-locked into position. Each central retaining element further has a finger-like lifting element which lies in the plane of the supporting surface and a support arm which is used to support central retaining element, so that the spring-catches and the lifting element can be pivoted around the support arm fitted on the base member. Due to the fact that the central retaining element of the above mentioned patent has been designed to have the push-button divided into several pieces or parts by radial slits and spring-catches which are formed by the collar projecting, when a user presses on such a push-button, the spring-catches and the lifting elements must be made to rotate about the support arms. However there is only a limited range or distance for the support arms to be optimumly positioned in the base member. Thus, the support arms can only be spaced a short distance from the spring-catches. Therefore, a user, when pressing on such push-button having several pieces or parts, must make greater effort to lift and move the disc from its storage case. In addition, since the push-button has several pieces or parts, often, the finger of a user can not press simultaneously on all pieces or parts of such push-button. Therefore, the disc may not be removed even if a greater effort is made, because a certain piece or part is not pressed down by the finger, and in this case, the damage of the surface of the disc may occur.

The applicant of the prior art patent has designed a separate press head inserted in the center of the central retaining element to overcome the above mentioned drawback that all pieces or parts of the push-button cannot be simultaneously pressed. The result of the prior art is that not only the structure of the storage case becomes correspondingly complicated, and more effort is needed to press down such push-buttons but also, the above-mentioned drawback still can not be completely eliminated.

SUMMARY OF THE INVENTION

The object of the present invention is to provide an improved single push button type storage case for retaining and storing disc-shaped information carriers, such as compact discs.

The first collar flange defined by the base of the storage case is provided with a central supporting portion on inner bottom, the central supporting portion consists mainly of a central retaining element, the central retaining element has projecting portions which passes through the clearance of the information carrier. In particular, the central retaining element comprises a push-button, at least two actuatable spring-catches forming a locking element, and at least two inactive supporting clips forming a supporting element. Each spring-catch has a first upwardly and outwardly projecting portion (called the first projecting portion for short) which overlaps the inner edge of the clearance of the information carrier, and a spring-arm extending radially and outwardly from the first projecting portions to the inner bottom along with a radially directed line and lying under the edge of the information carrier. Each supporting clip has a second upwardly projecting portion (called the second projecting portion for short) which has the same curvature radius as the inner edge of the clearance of the information carrier, and a supporting plate extending radially and outwardly from the second projecting portion. The spring-catches and the supporting clips are spaced each from other by means of the spacing slits. The spring arms and the supporting plates are tilted down from the first projecting portions and the second projecting portions to the inner bottom respectively to form a conical seat, and in the front portions of said spring-arms and said supporting plates are formed first plane portions and second plane portions which can be combined into a circular supporting surface and have substantially the same height as that of the step shoulder of stepped area for supporting the information carrier, such that an inserted CD lies simultaneously on the supporting surface and the stepper surface to keep the stability of the inserted CD. The inserted CD, therefore, does not touch the inner bottom.

The push-button is placed in a ring-shaped central hole surrounded and defined by the first projecting portion of said spring-catches and the second projecting portion of the supporting clips and is integrated with the extending portion of the inside of the spring-catches.

The inner bottom further is provided with a second collar flange which is connected with the rear ends of the spring-arms and the supporting plates. In a sense, the provision or setting up of the second collar flange can increase the torsional elasticity of the spring arm.

On a first plane portion of each spring-catch, there is provided an opening respectively, so that spring-arms are easy to be deformed elastically.

The first projecting portions of said spring-catches are tilted slightly outward.

The individual first projecting portions are provided with a projection which has a slight outwards titled surface on their upper edge, the projection, together with the central clearance of the information carrier, forming the catch type locking connection.

The outer surface of the storage case is covered a thin film so that the cleanness of the inside of the storage case can be maintained. In the present invention, the storage case and the film are made of plastic material.

The advantage of the structure according to the present invention lies in that a single piece of push-button can be used to press on the spring-catches of the central retaining element so that the first projecting portions and spring arms can bend downwardly about the bottom ends or rear ends of the spring arms thereby the locking or stopping state between the first projecting portion and the clearance of the disc can be released or separated and at the same time when the finger of a user is released from the push-button, the disc can be lifted upwards following the lifting of the projections of the first projecting portions, thereby the disc, after being released from locking, can be raised with stability, instead of rapid and abrupt lifting and possibly a certain spring-catch is in unreleased state as with the prior art storage case. The pivoting point or the support point for rotation is situated on the end of the spring arm, when bent, the pivoting or rotating arm is relatively longer, so that the pressing force needed for pressing the single push-button can be reduced, this results in easy or convenient use as well as longer service life of the storage case.

Other objects, features and advantages of the present invention will be apparent from the following description of a preferred embodiment thereof, taken in conjunction with the accompanying drawings described below wherein like components have like numerals throughout the several views.

DETAILED DESCRIPTION OF PREFERRED EMBODIMENT

Figure 1:
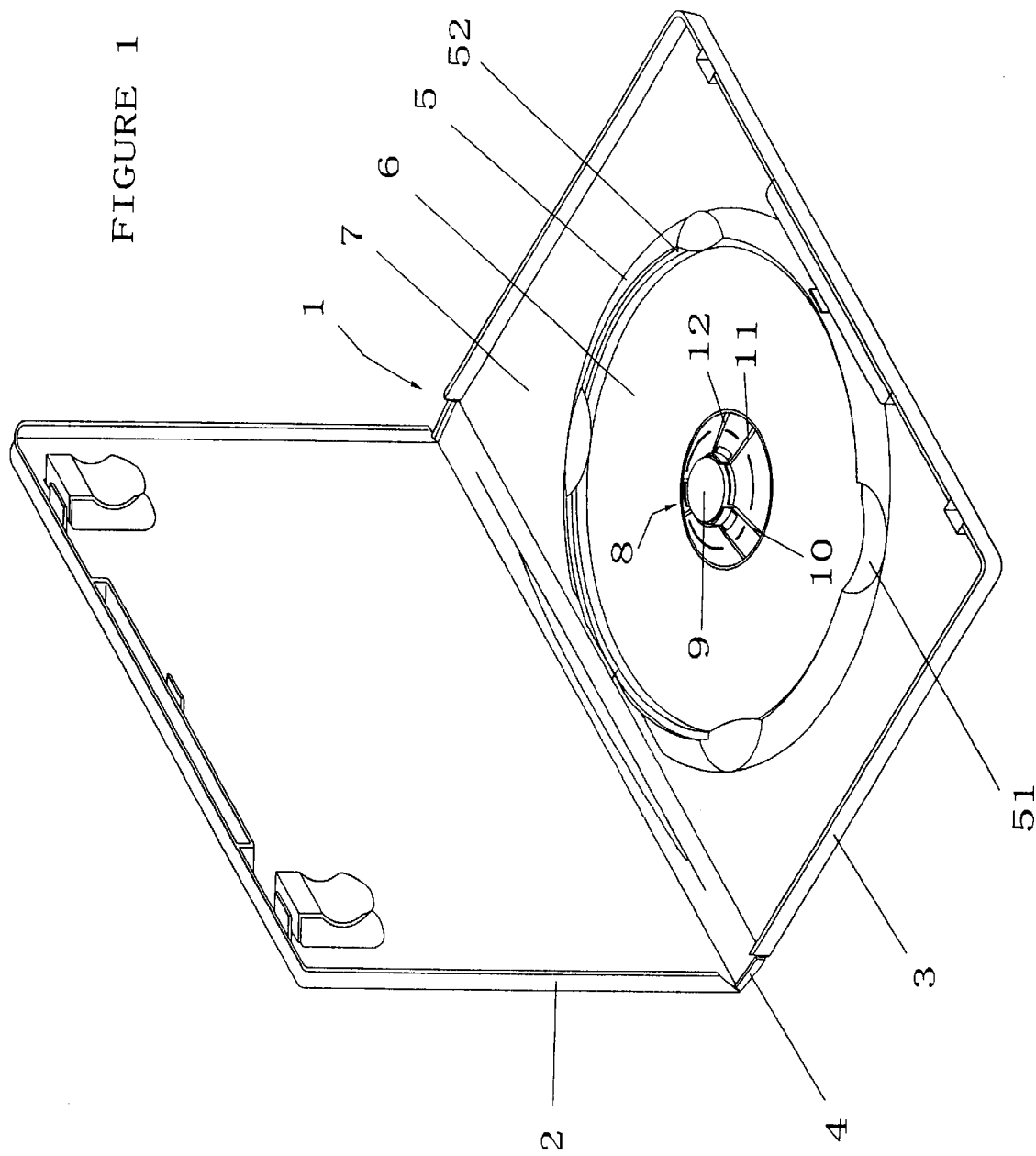
FIG. 1 is a perspective view of a storage case according to the present invention.
Figure 2:
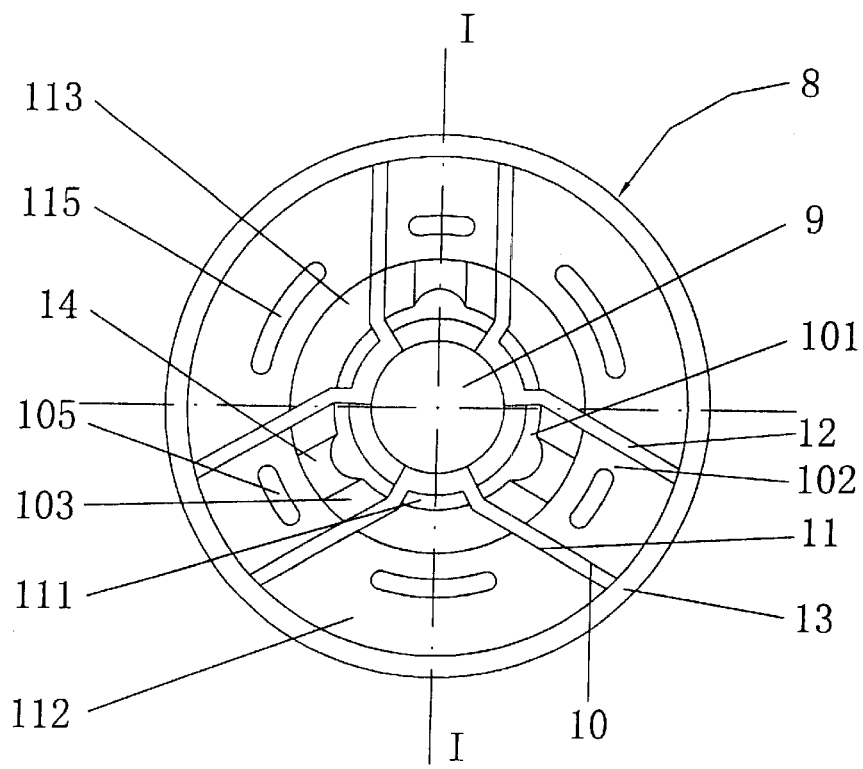
FIG. 2 is an enlarged top view of a central retaining element according to the present invention.

Referring to FIG. 1 and FIG. 2, a single push-button type storage case 1 for a disk-shaped information carrier, here-after referred to as a compact disc (CD), has a lid 2, a base 3 and a joint edge 4. The lid 2 and the base 3 are integrated by the joint edge 4. The central portion of the base 3 is provided with a first collar flange 5 which is provided with curved recesses 51 on it, into which the edge of an inserted CD extends slightly and thereby can be held by a hand, between the thumb and index finger. The base 3 is divided into an inner bottom 6 and an outside bottom 7 by the first collar flange 5. The first collar flange 5 is configured to surround the inserted CD around the peripheral edge. Preferably, the inner surfaces of the first collar flange 5 is a step-shaped area 52, so that the outer peripheral edge of the inserted CD can placed on the step surface of the stepped-shaped area 52.

A central supporting portion is provided on the inner bottom 6. The central supporting portion consists mainly of a central retaining element 8 which passes through a center hole of the information carrier. The central retaining element 8 comprises a push-button 9, at least two actuatable spring-catches 10 forming a locking element, and at least two inactive supporting clips 11 forming a supporting element. Each spring-catch 10 has a first upwardly and outwardly projecting portion 101 which overlaps the inner edge of the clearance (hole) of the information carrier, and a spring-arm 102 extending radially and outwardly from the first projecting portions 101 to the inner bottom 6 along a radially directed line and lying under the edge of the information carrier. Each supporting clip 11 has a second upwardly projecting portion 111 which has the same curvature radius as the inner edge of the clearance of the information carrier, and a supporting plate 112 extending radially and outwardly from the second projecting portion 111. The spring-catches 10 and the supporting clips 11 are spaced from each other by means of the spacing slits 12. The spring arms 102 and the supporting plates 112 are tilted down from the first projecting portions 101 and the second projecting portions 111 to the inner bottom 6 respectively to form a conical seat. In the front portions of the spring-arms 102 and the supporting plates 112 are formed first plane portions 103 and second plane portions 113 which can be combined into a circular supporting surface and have the same height as that of the step shoulder of stepped area 52 for supporting the information carrier, such that an inserted CD lies simultaneously on the supporting surface and the stepper surface to keep the stability of the inserted CD. The inserted CD, therefore, does not touch the inner bottom 6.

The push-button 9 is placed in a ring-shaped central hole surrounded and defined by the first projecting portion 101 of the spring-catches 10 and the second projecting portion 111 of the supporting clips 11 and is integrated with the extending portion of the inside of the spring-catches 10.

The inner bottom 6 further is provided with a second collar flange 13 which is connected with the rear ends of the spring-arms 102 and the supporting plates 112. The second collar flange 13 can serve for increasing the torsional elasticity of the spring arm.

On first plane portion 103 of each spring-catch 10, there is provided an opening 14 respectively, so that spring-arms 102 are easy to be deformed elastically.

On the intermediate surfaces of the spring-arms 102 and the supporting plates 112, there is provided a rib 105, 115 respectively.

The fan-shaped surface area of each spring-arm 102 is smaller than the fan-shaped surface area of each supporting plate 112.

The first projecting portions 101 of the spring-catches 10 are tilted slightly outward.

Figure 3:
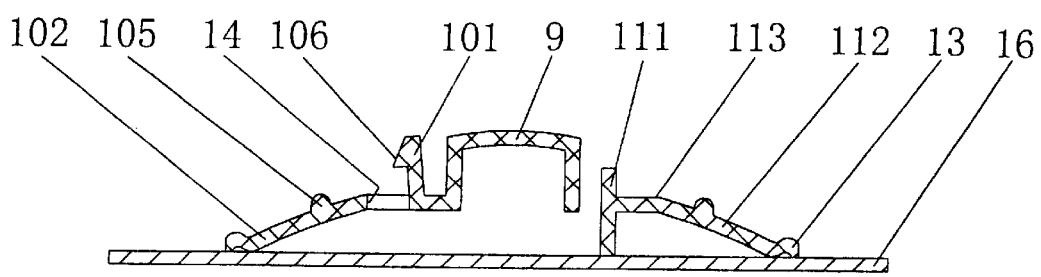
FIG. 3 is a cross-section view through central retaining element along the line I—I as indicated in FIG. 2.
Figure 4:
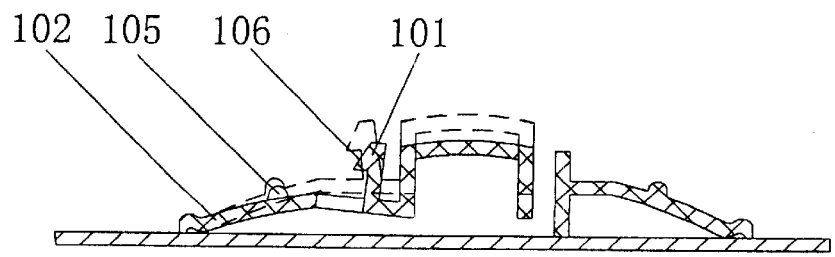
FIG. 4 is a view showing the spring catch in FIG. 3 moving from the dotted line to the solid line when a pressure is applied on the push-button.

Referring to FIG. 3 and FIG. 4, the individual first projecting portions 101 are provided with a projection 106 which has a slight outwards titled surface on their upper edge. The projection 106, together with the central clearance of the information carrier, forms the catch type locking connection.

The outer surface of the storage case is covered with a thin film 16 so that the cleanliness of the inside of the storage case can be maintained.

In use, when a user applies a pressure on the push-button 9, the spring-arm 102 of the spring-catch 10 then will tilt downwards around or about the rear end thereof, while the forward portion thereof will bend, as can be seen from FIG. 4. At the same time, the outer peripheral edge of the projection 106 of the first projecting portion 101 will recede so that the radius formed by the outer peripheral edge of the projection 106 becomes smaller than the radius of the central clearance of the inserted CD. When the pressure of the finger is released, the projection 106 will turn outwardly and forwardly following the upward restoration of the spring arm 102 and will make the outside tilted surfaces of the projections 106 lift the compact disc from the supporting surface and the stepped surface in a manner of lifting upwardly the peripheral edge of the clearance of the inserted CD. As such, the user can remove the CD readily from the curved recess in the first collar flange 5.

There are many changes and modifications which can be made to applicant's single push button type storage case which would be obvious to one of ordinary skill in the art, and which are included in the scope of applicant's invention. It is intended that applicant's invention be limited only by the scope of the claims appended hereto.

What is claimed is:

1. A single push-button type storage case for a disk-shaped information carrier having a centrally disposed hole, comprising:

a lid;

a joint edge;

a base integrally joined to said lid by way of said joint edge;

a first collar flange disposed at a center of said base and which defines said base into an outer bottom disposed outside of said first collar flange and an inner bottom located in said first collar flange, said first collar flange being substantially fitted to an outline of an information carrier inserted therein; and a central supporting portion disposed on the inner bottom, the central supporting portion including:

at least two actuatable spring-catches forming a locking element, each spring-catch having a first upwardly and outwardly projecting portion which is adapted to overlap an inner edge of the hole of the information carrier, each spring-catch further comprising a spring-arm extending radially and outwardly from the first projecting portion along a radially directed line so as to lie under the information carrier, each said spring-arm having an inner horizontal plane portion that extends out from the first projecting portion, each said spring-arm further having an outer tilted portion that tilts down from the plane portion to the inner bottom, the tilted potion having a length that is substantially greater than a length of the plane portion so as to increase flexibility of the spring-arm; and at least two inactive supporting clips forming a supporting element, each supporting clip having a second upwardly projecting portion which has a same curvature radius as the inner edge of the hole of the information carrier, each supporting clip further comprising a supporting plate that extends radially outward from the second projecting portion, each said supporting plate having an inner horizontal plane portion that extends out from the second projecting portion, and each having an outer tilted portion that tilts down to the inner bottom, the respective tilted portions of said supporting clips and said spring-catches collectively forming a conical seat, the respective plane portions of said supporting clips and said spring-catches collectively forming a circular supporting surface for supporting the information carrier at the edge of the hole, the spring-catches and the supporting clips being spaced from each other using spacing slits; and a push-button, said push-button, said first projecting portions and said second projecting portions collectively forming a central retaining element that is adapted to pass through the hole of the information carrier, with said first projecting portions engaging the edge of the hole of the information carrier to retain the information carrier in place, said push-button being disposed in a central hole defined by said spring-catches and the supporting clips and being integrated with an underside of the spring-catches, wherein when said push button is pushed, said first projecting portions disengage the edge of the hole of the information carrier, and wherein the increased flexibility of said spring arms reduces an amount of force needed to push the push button to disengage said first projecting portions.

2. The storage case according to claim 1, wherein a bottom of an interior of the first collar flange includes a second collar flange, the second collar flange being connected with rear ends of the spring-arms and the supporting plates.

3. The single push-button type storage case according to claim 1, wherein each plane portion of said spring-catches has an opening formed therein.

4. The single push-button type storage case according to claim 1, wherein each spring-arm and supporting plate has a rib on an intermediate surface thereof.

5. The single push-button type storage case according to claim 1, wherein each spring-arm and each supporting plate has a fan-shaped surface area, the fan-shaped surface area of each spring-arm being smaller than the fan-shaped surface area of each supporting plate.

6. The single push-button type storage case according to claim 1, wherein the first projecting portion of said spring-catches is tilted slightly outward.

* * * * *